United States Patent Office 3,076,513
Patented Feb. 5, 1963

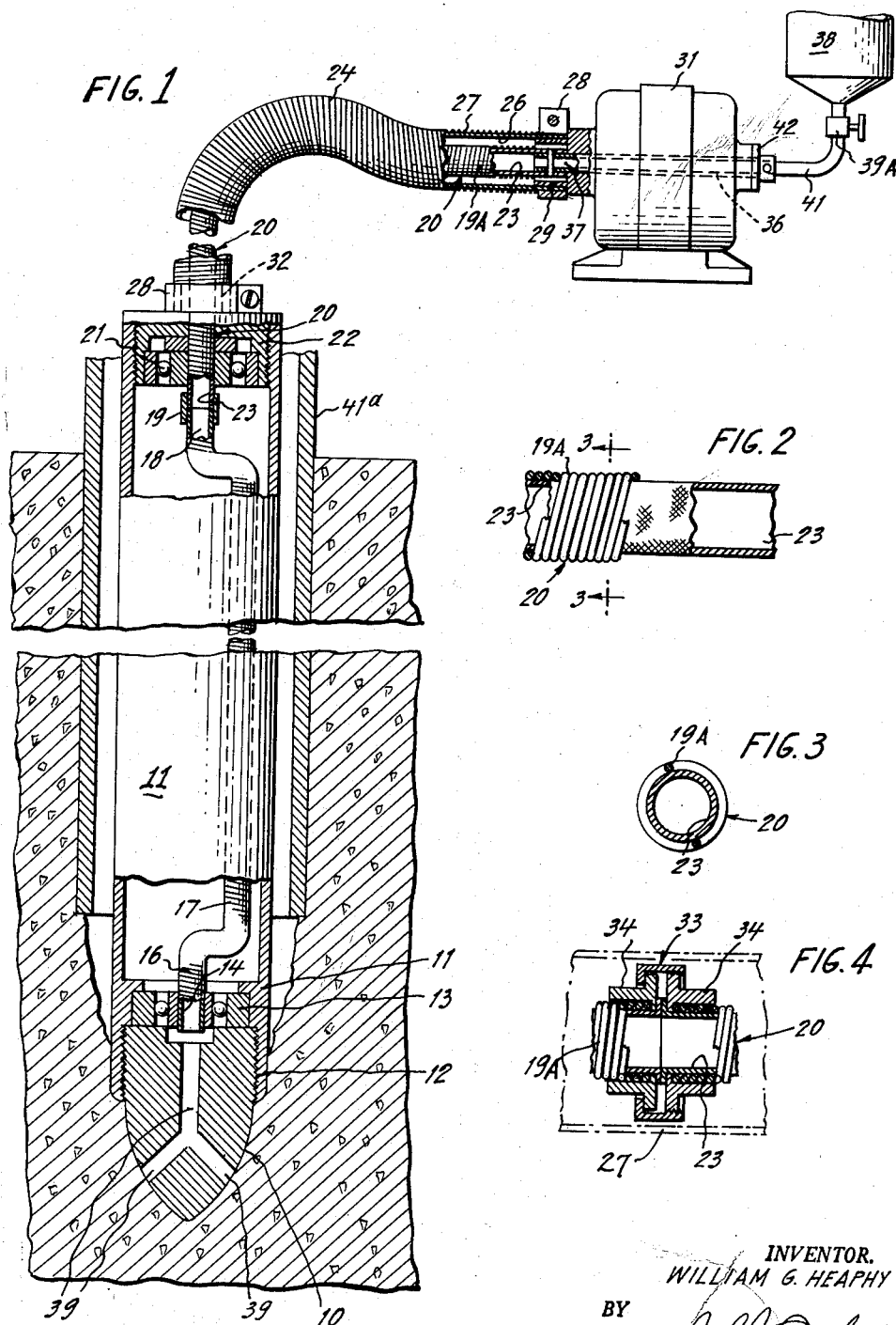

3,076,513
POWER CONVEYING DRIVE MEANS
William G. Heaphy, 24 Powder Horn Hill, Wilton, Conn.
Filed June 21, 1960, Ser. No. 37,737
7 Claims. (Cl. 175—55)

This invention relates to power conveying drive means and in particular to a structure through which fluid, gas or air can be fed to increase the operating efficiency of the driven device.

In underground piercing operations or in other instances where a vibratory piercing or feeding member is operating in a hole it is advantageous if a fluid such as water or a gas such as air can be applied, through the drive member, to cool or lubricate the piercing head or assist in the crumbling action as applied to the earth or the relief of air pockets in poured concrete and to this end a principal object of my invention is to provide means whereby a tool may be operated and fluid fed through the operating or drive means to accomplish the result sought more efficiency and quickly.

A further object of the invention is to so construct a power operated drive means that it can be taken apart as it is raised out of a hole and can have parts readily added thereto as the hole being bored becomes deeper.

Further objects of the invention include the provision of means; for rendering the hollow drive shaft suitable as a conductor for fluid or gas; for making the drive shaft in sections; for making an outer casing of armored cable also in sections so that it can be separated or assembled for use and also for making the armored cable, along with the drive shaft, of flexible hose so that as a unit it can be wound on a reel where the boring operations are of not too great a depth.

The novel features which are believed to be characteristic of the invention, both as to its organization and method of operation, together with further objects and advantages thereof, will be better undersood from the following description considered in connection with the accompanying drawing in which an embodiment of the invention is illustrated by way of example. It is to be understood, however, that the drawing is for the purpose of illustration and description only and is not intended as a definition of the limits of the invention.

FIGURE 1 is a view partly in section showing the armored casing and drive shaft connections from a power means to a boring tool;

FIGURE 2 is an enlarged view in section of a portion of the flexible driving shaft and inner liner therefor;

FIGURE 3 is a section on the line 3—3 of FIGURE 2 showing the relation of the parts of the driving shaft, and FIGURE 4 is a fragmentary view in section showing how the driving shaft may be jointed without affecting the fluid conveying properties of the lining thereof.

Referring to the drawing in detail 10 indicates the bit end of a tool used in boring operations and rendered effective by a high degree of vibration rather than rotary drilling operation. This bit 10 is threaded as at 12 into the lower or socket end of a tubular casing 11 which is shaped to provide a receptacle in which is seated a ball bearing 13 to the center of which is suitably secured as at 14 the offset end 16 of a vibrator 17 made of hollow metal tubing and having an opposite or upper offset end 18 which is in axial alignment with the end 16 and both ends of which are in axial alignment with the casing 11. The upper end of the vibrator 17 may be secured as by a sleeve or collar 19 to the end of a flexible shaft 20 whose end is secured in a ball bearing 21 disposed in a plug 22 threaded into the upper end of the casing 11. The flexible shaft 20 is of the usual outer closely wound wire cable form 19A and is covered inside with a tubular lining 23 of any material impervious to water, gas or air. This shaft 20 is encased in an armored flexible hose 24 of well known structure including an inner rubber lining 26 and an outer closely wound helical wire covering 27 all of which is flexible and units of which, in desired lengths, can be attached to each other by clamps 28 which are shown in use for securing the ends of the armored hose or cable to the flange 29 of a motor 31 and the flange 32 of the plug 22, respectively. The use of the word "hose" herein with respect to the member 24 does not imply that fluid is conducted therethrough as the member 24 serves as a protective housing for the flexible drive shaft 20, which in itself is a hose for conducting fluid, oil, gas or air. The units or sections of the shaft 20, as shown in FIGURE 4 may be joined by suitable unions 33 whose sleeves 34 may be welded or otherwise secured to the wire covering 19A. This same connection means may also be employed in joining sections of the covering member 27 and a showing thereof, in view of FIGURE 4, is not deemed to be necessary in view of the showing of clamp 28 in FIGURE 1.

The motor 31 is provided with a hollow drive shaft 36 to one end of which, as at 37, is secured one end of the hollow flexible drive shaft 20, the other end of the latter being secured to the vibrator 17, as above explained, by the sleeve 19. Fluid, oil, gas or water can be supplied from a tank or other suitable container 38 and the flow thereof regulated by a valve 39A in the line 41, the end of which is secured in a packing box 42 abutting the end of the hollow motor drive shaft 36.

In the operation of the device the flexible shaft 20 drives the vibrator 17 and the vibrating, shaking or oscillating motion set up in the bit end 10, combined with the weight of the tool casing 11, cooperate to cause the tool to dig into the earth or other material with the fluid being supplied from the drive shaft through the vibrator and out through the bores 39 of the bit 10 to soften the earth or other material in which the apparatus is working. The vibrating or oscillating motion is caused by the operation of the offset section of the vibrator 17 in the same manner as such motion is set up by the member 12 in Patent No. 2,340,959 or member 3 of Patent No. 2,229,-912. This motion is actually a shaking motion which, combined with weight of the tool, causes the latter to settle further into the material as the latter is softened by the fluid supplied through the bit end of the tool. Further, the somewhat flexible nature of the vibrator 17 may cause it to bow slightly different amounts under change of speed in motor operation, which action will set up a shaking action in the casing 11 and bit 10. As the boring proceeds the usual caisson piping 41ª may be put in place in the well known manner which supports the earth and also facilitates removal of the bit end, which because only a vibratory or shaking motion is imparted to it will not become worn so rapidly as a drill bit and the fluid supplied will soften the earth and make the boring easier.

While I have described what I consider to be a highly desirable embodiment of my invention, it is obvious that changes in form could be made without departing from the spirit of the invention and I therefore do not limit myself to the exact form herein shown or described nor to anything less than the whole of my invention as hereinbefore set forth, and as hereinafter claimed.

What I claim is:

1. In a power conveying drive means in combination, a casing, plug means closing the opposite ends of said casing and one of said plug means constituting a ground engaging bit bored to provide fluid passages therein, a hollow vibrator means having an offset portion rotatably mounted in said casing, a hollow tool drive shaft for rotating said vibrator means, bearings in said casing in which the vibrator and the tool drive shaft are supported, a motor having a hollow motor drive shaft and to one end of which said hollow drive tool shaft is attached, means attached to the other end of said motor drive shaft for supplying a fluid to the bit through the motor shaft, the tool drive shaft and the vibrating means, and armored conduit means connecting the motor and said casing and constituting a housing for said tool drive shaft.

2. A power conveying drive means combination as set forth in claim 1 in which said vibrator means includes a straight section of tubing having offset ends in axial alignment with the longitudinal center of said casing whereby the rotary motion of said vibrator means causes said casing to vibrate.

3. A power conveying drive means combination as set forth in claim 1 in which said hollow tool drive shaft comprises a helically wound wire casing and an inner tubular sleeve of leakproof material.

4. A power conveying drive means combination as set forth in claim 3 including means for detachably joining sections of said drive shaft to provide fluid tight connections therebetween.

5. A power conveying drive means combination as set forth in claim 1 in which said means for supplying fluid includes a container, a line connecting the container and the hollow motor drive shaft, and valve means for controlling the flow of fluid through said shafts and vibrator.

6. A power conveying drive means combination as set forth in claim 1 in which said armored conduit means includes a flexible hose, a helically wound wire covering for said hose and coupling means including clamps for detachably connecting the conduit means at opposite ends respectively to the casing and the motor.

7. A power conveying drive means combination as set forth in claim 1 in which the opposite ends of said casing are threaded, one end receiving the bit and the opposite end receiving a plug, anti-friction bearing means secured in said casing adjacent said bit and in said plug whereby the parts can be separated for servicing and replacement.

References Cited in the file of this patent

UNITED STATES PATENTS

| | | |
|---|---|---|
| 1,044,920 | Schilow | Nov. 19, 1912 |
| 1,481,078 | Albertson | Jan. 15, 1924 |
| 2,229,912 | Baily | Jan. 28, 1941 |
| 2,340,959 | Harth | Feb. 8, 1944 |
| 2,679,061 | Baker | May 25, 1954 |